United States Patent [19]

DePierre et al.

[11] Patent Number: 5,123,694
[45] Date of Patent: Jun. 23, 1992

[54] SPIRAL TAPER CUT IMPACT BEAM

[75] Inventors: Robert J. DePierre, Kalamazoo; Alessandro Libriani, Grand Rapids, both of Mich.

[73] Assignee: Benteler Industries, Inc., Grand Rapids, Mich.

[21] Appl. No.: 717,543

[22] Filed: Jun. 19, 1991

[51] Int. Cl.⁵ ............................. B60R 27/00
[52] U.S. Cl. .................. 296/188; 296/146; 49/502
[58] Field of Search .......... 296/188, 189, 146; 49/502; 52/731, 720

[56] References Cited

U.S. PATENT DOCUMENTS

| | | | |
|---|---|---|---|
| 1,821,850 | 9/1931 | Riemenschneider | 52/720 |
| 4,636,608 | 1/1987 | Palentyn et al. | 219/121 |
| 4,708,390 | 11/1987 | Palentyn et al. | 296/188 |
| 4,866,883 | 9/1989 | Brown et al. | 296/188 X |
| 4,919,473 | 4/1990 | Laimighofer et al. | 296/188 |
| 4,978,562 | 12/1990 | Wycech | 296/188 X |

FOREIGN PATENT DOCUMENTS 395621 10/1990 European Pat. Off.
3500551 6/1986 Fed. Rep. of Germany.

Primary Examiner—Robert R. Song
Attorney, Agent, or Firm—Price, Heneveld, Cooper, DeWitt & Litton

[57] ABSTRACT

A vehicle door impact beam having an elongated tubular body with a central axis, the end portions of the beam being taper cut to form inner and outer termini and opposite taper surfaces for each end, the included angle at the inner termini being greater than 180 degrees and the outer termini being less than 180 degrees, and the first and second taper surfaces each spiraling from the inner terminus to the outer terminus through an angle of about 90 degrees. The inner termini of both ends are on opposite sides of the beam, and the outer termini of both ends are on the same side of the beam.

23 Claims, 4 Drawing Sheets

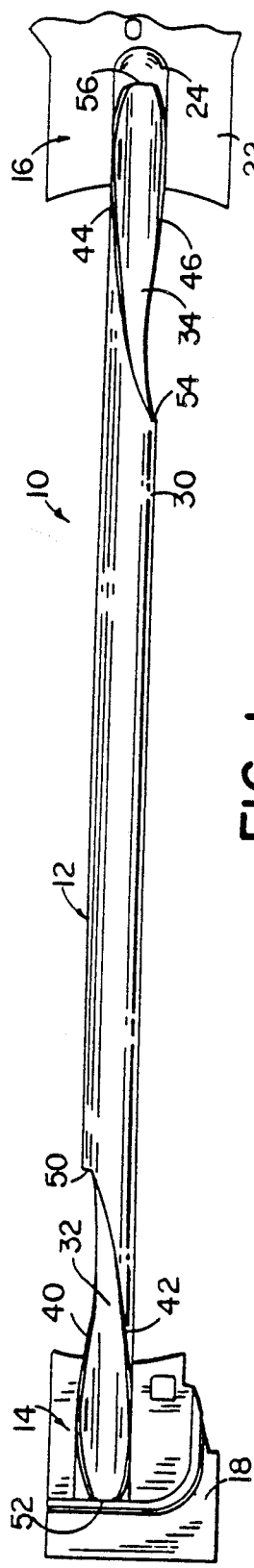
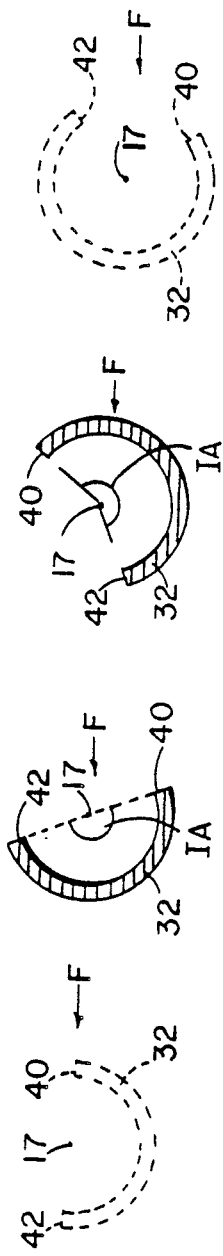
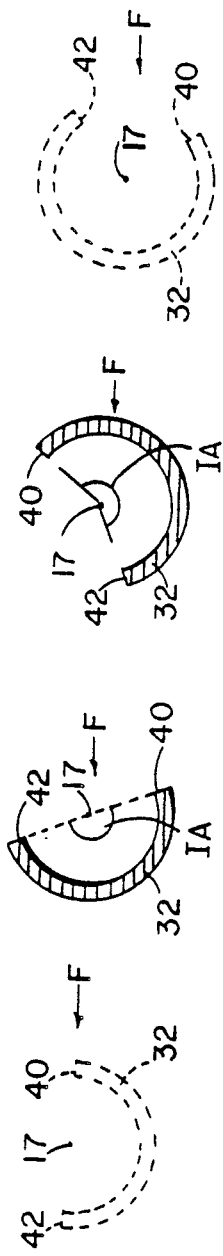
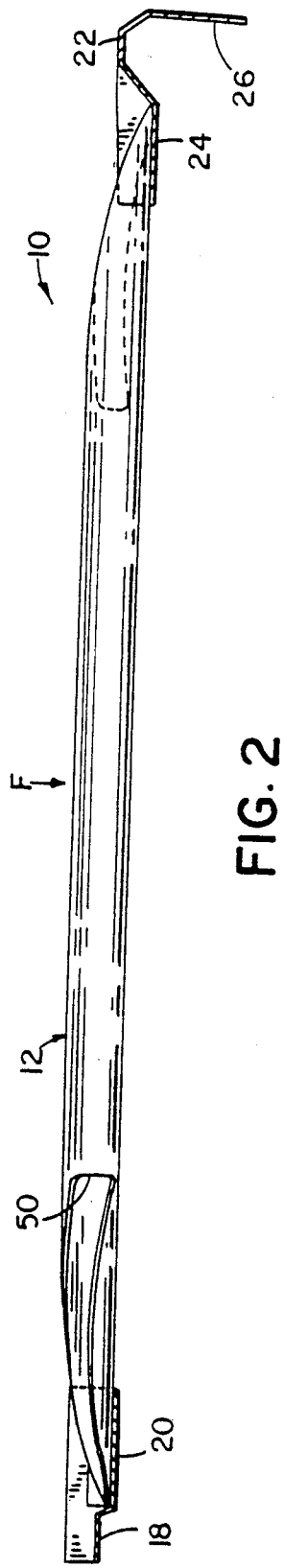
FIG. 1   FIG. 7   FIG. 8   FIG. 9   FIG. 10   FIG. 2

SPIRAL TAPER CUT IMPACT BEAM

RELATED APPLICATION

This application is a continuation-in-part application of copending application Ser. No. 631,099, filed Dec. 19, 1990, now U.S. Pat. No. 5,118,159 entitled OPTIMIZED MOMENT CAPACITY NESTABLE DOOR BEAM, and assigned to the assignee herein.

BACKGROUND OF THE INVENTION

This invention relates to vehicle door impact beams. Subsequent to enactment of Federal Motor Vehicle Safety Standard 214 (FMVSS214) which specifies side door strength requirements for vehicles, door impact beams of various designs have been proposed. Employees of the assignee herein have conceived and developed certain tubular beam designs which meet specifications of FMVSS214, while saving material, see especially U.S. Pat. Nos. 4,636,608 and 4,708,390 Subsequent developments are set forth in pending application Ser. No. 631,099, filed Dec. 19, 1990, and assigned to the assignee herein. Tapering the ends of the tubular beams has the advantages of 1) accommodating vehicle door curvature, 2) saving material, 3) lowering beam weight, and 4) potentially enabling the beam to be nestable (i.e. the material removed from the end of one beam can form the opposite end of the second beam, etc.).

The basic function of the impact beam is to minimize injury to persons in the vehicle during side collision. Side collision is characterized by an impact load or force applied generally horizontally, transverse &o the vehicle door, generally normal to the horizontal beam, thereby applying a bending moment to the impact beam which extends across the door within the confines of the inner and outer door shells. The beam should have moment capacity, at each location along its length, greater than the bending moment caused thereat by the specified impact load in the FMVSS 214 Standard.

The ability to increase the moment of inertia, thus increasing the moment capacity of the beam, without increasing beam weight, or preferably even with a decreased beam weight, would be particularly advantageous.

When the end portions of tubular beams are provided with a taper cut, the ends have only a fraction of the tube remaining there, i.e., a relatively small included angle with portions having an included angle of less than 180 degrees, and other portions having an included angle greater than 180 degrees. The "included angle" is that angle between two lines extending from the center line of the tubular beam to the taper edges on opposite sides of the center line, to indicate the degree of peripheral wall remaining.

If such a tapered beam structure is "edge loaded" relative to the remaining peripheral wall, i.e., has the impact force applied in a manner depicted in FIG. 7, the tube portion theoretically has a greater moment of inertia, i.e., $I_x = 0.5 I_F$, where $I_x$ is the moment of inertia at that point, and $I_F$ is the moment of inertia assuming the tube to be a full tube for included angles equal to 180 degrees. However, when a centrally located force is applied to the tubing structure, the reactive force at the tapered section is offset from the applied force causing a couple and hence twisting or torquing the tapered section, which may cause buckling. Therefore, prior taper cut beams, as in U.S. Pat. Nos. 4,636,608 and 4,708,390, have been mounted so that the impact force will be face applied relative to the end portions, as depicted in FIG. 8, thereby creating no torque on these end sections. However, the moment of inertia of these end portions is much less when face loaded, i.e., $I_x = 0.095 I_F$ for an included angle of 180 degrees.

When the included angle of the end portion is 180 degrees or greater, it is preferable to have the impact force applied in edge loading fashion (see FIG. 9), rather than face loading as in FIG. 10, because the moment of inertia is much greater as explained above, and moreover the force does not create an off center torque.

In consideration of these factors, a novel tubular impact beam was conceived to increase the moment capacity, or if desired to maintain the prior moment capacity while lengthening the taper cut.

SUMMARY OF THE INVENTION

The present invention provides a vehicle door impact beam of the tapered end type, having novel structure achieving increased moment capacity allowing use of less beam material with longer tapered end portions. The taper surfaces spiral about the central axis of the tube, increasing the moment of inertia in the plane perpendicular to the applied load. The structure enables longer taper cuts to be employed while maintaining adequate moment of inertia, thereby reducing weight and the amount of material required. Yet, it has ease of manufacture. The spiral on each end portion extends through a total spiral angle of about 90°. The beam ends preferably fit within concave recesses in the brackets, sometimes called extensions, when they are welded in place.

The outer half of the end portions having an included angle less than 180 degrees, when mounted to extensions, are oriented so that the force is basically face applied, while the inner half of the end portions having an included angle greater than 180 degrees, when mounted, are oriented so that the force is basically edge applied. Hence, torque on the intermediate segments of each tapered end portion is minimized.

Each tapered end has an inner terminus and an outer terminus. The inner termini of the two ends are 180 degrees displaced from each other. The outer termini of the two ends are on the same side of the beam, i.e., displaced zero degrees from each other.

These and other objects, advantages and features of the invention will become apparent upon studying the following detailed specification in conjunction with the drawings.

BRIEF DESCRIPTION OF THE DRAWINGS

FIG. 1 is a side elevational view of a vehicle door impact beam and mount assembly according to this invention;

FIG. 2 is a top plan view of the assembly in FIG. 1, with the mounting brackets shown in section;

FIG. 7 is a sectional diagrammatic view of an outer part of an end portion of the impact beam, showing the force (theoretically) being "edge" applied;

FIG. 8 is a diagrammatic view of an outer end portion like that in FIG. 7, taken on plane VIII—VIII of FIG. 3, with a small included angle less than 180 degrees, showing the force being substantially "face" applied;

FIG. 9 is a diagrammatic view of an inner part of an end portion of the impact beam, taken on plane IX—IX of FIG. 3, having an included angle greater than 180 degrees, showing the impact force being "edge" applied;

FIG. 10 is a diagrammatic sectional view of the inner end portion in FIG. 9, showing the impact force being face applied.

DESCRIPTION OF THE PREFERRED EMBODIMENTS

Figure 3:
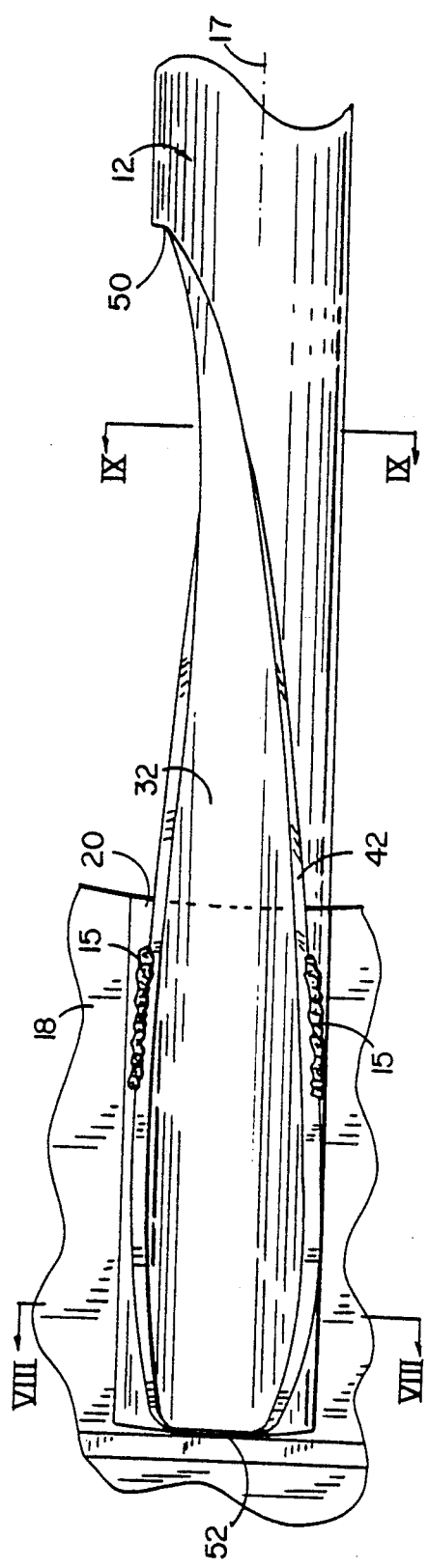
FIG. 3 is a fragmentary, enlarged, side elevational view of the left end of the beam and mount assembly in FIG. 1.
Figure 4:
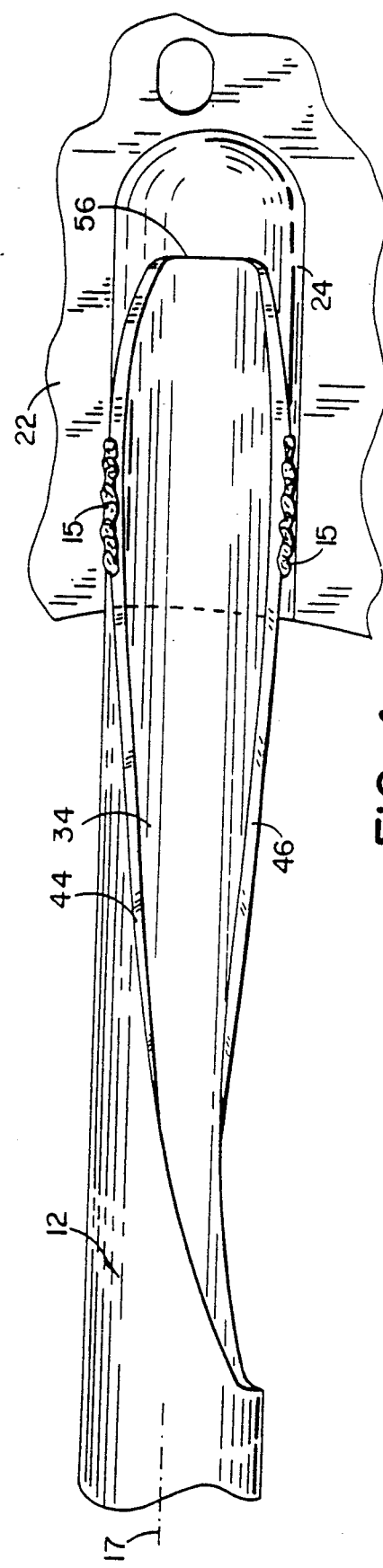
FIG. 4 is a fragmentary, enlarged, side elevational view of the right end of the beam and mount assembly in FIG. 1.
Figure 5:
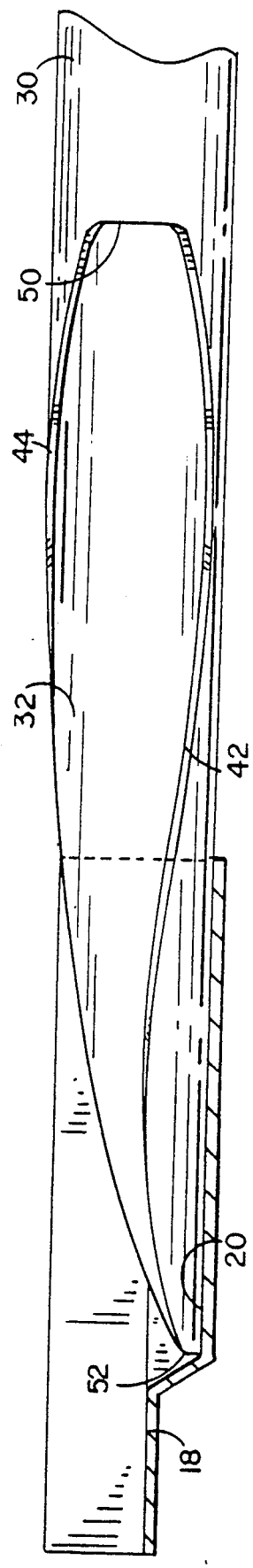
FIG. 5 is a fragmentary, enlarged, top plan view of the left portion of the assembly in FIG. 2.
Figure 6:
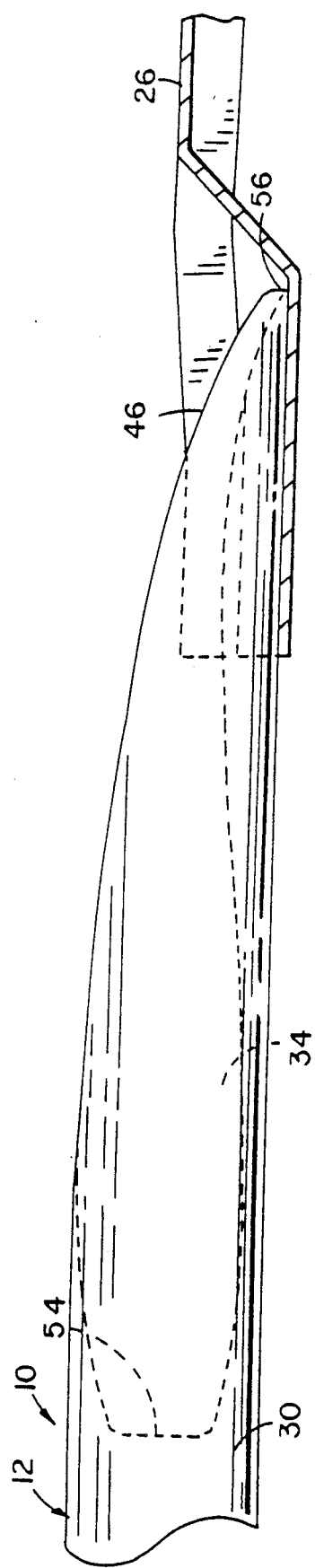
FIG. 6 is a fragmentary, enlarged, top plan view of the right end portion of the assembly in FIG. 2.
Figure 11:
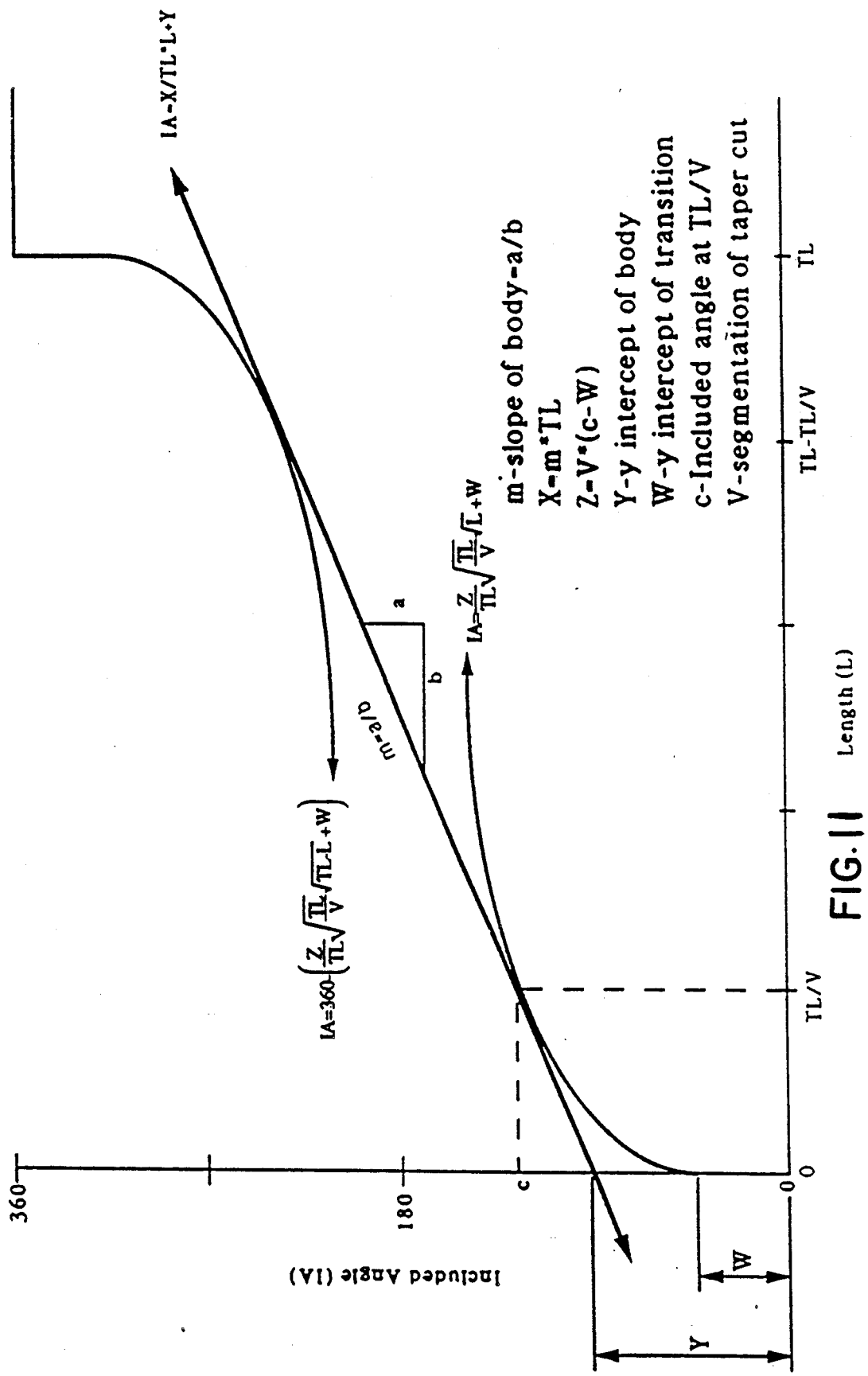
FIG. 11 is a graphic display of taper length versus included angle.

Referring now specifically to the drawings, the vehicle impact beam and mount assembly 10 (FIGS. 1 and 2) comprises an elongated, taper cut, tubular impact beam 12, and first and second mounts, brackets or extensions 14 and 16. These mounts may be of varied configuration to accommodate the particular make, size and model of the vehicle, i.e., automobile or truck, involved. Mounts 14 and are typical of those employed. Mount 14 is shown to include a generally planar portion 18 having an elongated, concave, curvilinear, semicylindrical recess 20 therein, of an inner diameter generally corresponding to the outer diameter of beam 12. Mount 16 likewise has a generally planar portion 22 and an elongated, concave, curvilinear, semicylindrical cavity 24 for receiving the beam end. Bracket 16 is also shown with a transverse flange 26 ((FIG. 2) for fitting a particular door style. These mounts are secured to the door frame by bolting or welding. Elongated cavity 24 also has an inner diameter generally comparable to the outer diameter of beam 12 for receiving the beam end. The beam ends are welded to brackets 14 and 16 at zones 15 (FIGS. 3 and 4).

The impact beam comprises an elongated, tubular member, generally cylindrical in configuration, having a central portion 30, a first end portion 32, and a second opposite end portion 34. It is preferably made of steel such as that in U.S. Pat. No. 4,210,467, commonly called BTR 110. The peripheral wall of each of these end portions is taper cut along the length of the end portion in a manner to expose a pair of opposite taper surfaces, specifically taper surfaces 40 and 42 on end portion 32 and taper surfaces 44 and 46 on end portion 34. Each taper surface extends through the thickness of the wall. They are on both sides of the central axis of the tube, to provide the first and second taper surfaces on opposite sides of and equally spaced from the central axis of the beam. The two surfaces of each pair of taper surfaces join each other at the inner and outer termini of the cut. These taper surfaces preferably are aligned throughout their length with the central axis of the beam such that, at each increment along the taper surface length, a plane passing through that increment will also pass through the central axis of the beam. The taper cut on end portion 32 has an inner axial terminus 50 and an outer axial terminus 52. The taper cut on end portion 34 has an inner axial terminus 54 and an outer axial terminus 56.

Both taper surfaces on each end portion thus extend spirally between the inner terminus and the outer terminus thereof. As depicted, each inner terminus is an arc in a plane transverse to, and preferably normal to, the beam axis. Each outer terminus is an arc in a plane transverse to, and preferably normal to, the beam axis. The spiral in each end portion, between the inner and outer termini, optimally extends through an angle of about 90 degrees. One portion, here the first end portion 32, has the inner terminus on the top of the beam, with the spiral extending counterclockwise. End portion 34 has the inner terminus on the opposite side of the beam, i.e., here the bottom of the beam, displaced 180 degrees from the inner terminus on the first end portion. The spiral on depicted end portion 34 also extends counterclockwise, i.e., the two opposite tapered end portions spiral in the same angular direction.

Each tapered end portion has an outer part, i.e., nearer the outer terminus, having an included angle less than 180 degrees, and an inner part, i.e., nearer the inner terminus, having an included angle greater than 180 degrees. The outer part is prone to be unstable if impact force is edge applied as in FIG. 7, due to torque-caused buckling, but is stable when impact force is substantially face applied as in FIG. 8. This outer part is provided with additional moment capacity by the attached mounting plate or extension 14 or 16. The spiral configuration of the tapered end causes the impact force to be fully face applied at the outer terminus, and fully edge applied at the inner terminus, with a gradual shift between the two over the length of the taper cut. Generally midway between the termini, some torque results from impact force, but it is relatively small.

The respective taper cuts are preferably formed utilizing a conventional cutting laser beam oriented toward the center line axis 17 of impact beam 12 while the impact beam is rotationally and axially advanced relative to the laser beam to sequentially cut one side, the inner terminus, and then the other side. When one end is taper cut, automatically the opposite end of the next beam is simultaneously formed, i.e., the two beams are nestable. A suitable cutting source (not shown) can be a 1250 watt conventional carbon dioxide cutting laser or the equivalent.

It has been determined by calculation and through experimentation that this uniquely configured, tubular, tapered end beam is capable of providing increased moment capacity under impact force. This allows the tapered portions to be made longer than those of predecessor beams, while still achieving proper moment capacity at any segment of the end portion, i.e., greater than the bending moment at that segment. Thus, this longer taper achieves adequate strength to satisfy the impact requirements of the federal standards while saving considerable material and weight, and enabling fit inside thin and/or curvilinear doors more readily. The fact that the beam can be made lighter in weight not only saves beam material, but also decreases vehicle weight for better economy of fuel usage. Yet, the beam is nestable, i.e., the material removed from one end of the beam during manufacture actually forms the opposite end, i.e., second end, of the next beam being formed.

The fragmentary distance along the total cut length TL of either the first end portion 32 or the second end portion 34, at which an evaluation is to be made, is designated L. In the illustrated embodiment, the total taper length TL is divided into fifths, i.e., 0.2 TL lengths. Other fractions could be employed. The total taper length TL is the linear length of the tube over which the cut extends. At any incremental length L along the total length TL of the taper cut, there is an included angle (IA) of the material remaining between the two mirror image opposite sides of the cut (see e.g., FIGS. 7 and 9). The beam has a greater peripheral partial circumference adjacent the central beam portion, and a smaller peripheral partial circumference adjacent the outer terminus of the taper cut. To achieve desired moment capacity in all increments of the impact beam, including along the taper cut end portions, the moment capacity $M_C$ at each increment along the length of the beam is made greater than the bending moment $M_B$ (FIG. 2) so that impact will cause the beam to hinge near the center of the beam rather than at the taper cut end portions. The included angle should not be excessive.

Each taper cut end portion has a central body and two body straddling transitions. There is a relationship between the configuration of the central body and the two transitions of each taper cut, these being defined in terms of the included angle IA as set forth below. Generally, the shape of the central body is a linear slope, or close thereto, in a spiral, while each of the two transitions is of parabolic curvature, or close thereto, in a spiral.

The included angle of the central body is generally defined by:

$$IA = X/TL\,(L) + Y$$

Where
IA = included angle at a particular location
m = slope of central body taper surface
X = slope of the taper surface times total taper length = m(TL)
TL = total taper length
L = the fraction of total taper length at a particular location
Y = the Y axis intercept of the body slope.

The preferred included angle of the central body is defined as:

$$IA = 150/TL\,(L) + 105;$$

for $0.2\,TL \geq L \geq 0.8\,TL$

The included angle of the outer end transition is generally defined by:

$$IA = Z/TL\sqrt{TL/V}\,(\sqrt{L}) + W$$

Where
Z = parabola shape = (V)(c-W)
V = number of segments in the total taper length
W = parabola intercept with Y axis
c = included angle at TL/V
m = slope of central body taper surface.

The preferred included angle of the outer end transition is defined by:

$$IA = 495/TL\sqrt{(TL/5)}\,\sqrt{L} + 36$$

for $0 \leq L \leq 0.2\,TL$

The included angle of the inner end transition is generally defined by:

$$IA = 360 - [Z/TL(\sqrt{TL/V})\sqrt{(TL-L}+W]$$

The preferred included angle is defined by:

$$IA = 360 - [495/TL\sqrt{(TL/5)}\,\sqrt{(TL-L)} + 36]$$

for $0.8\,TL \leq L \leq TL$

These relationships are based on the spiral taper surfaces being theoretically projected to a non-spiral condition.

Conceivably, the unique beam details could be modified somewhat to fit particular circumstances or style of vehicle, without departing from the unique concept embodied. Hence, the invention is not intended to be limited to the specific preferred embodiment set forth as illustrative, but only by the scope of the appended claims and the reasonably equivalent structures to those defined therein.

The embodiments of the invention in which an exclusive property or privilege is claimed are defined as follows.

1. A vehicle door impact beam comprising:
   an elongated tubular member having a central axis, a peripheral wall, and a pair of ends, and comprising a central portion and first and second end portions;
   said peripheral wall of each of said end portions being taper cut along the length thereof through the thickness of said wall on both sides of said central axis in a manner to thereby provide first and second taper surfaces on opposite sides of said central axis;
   said taper surfaces of each of said first and second end portions having an outer axial terminus at the respective outer end of said beam, and having an inner axial terminus spaced from said respective outer end of said beam;
   the included angle of said wall between said first and second taper surfaces varying from greater than 180 degrees near said inner terminus to less than 180 degrees near said outer terminus;
   said taper surfaces in said first end portion both extending spirally from said inner terminus in said first end portion through an angle of about 90 degrees to said outer terminus of said first end portion; and
   said taper surfaces in said second end portion both extending spirally from said inner terminus in said second end portion through an angle of about 90 degrees to said outer terminus of said second end portion.

2. The vehicle door impact beam of claim 1 wherein said taper surfaces of both said first and second end portions spiral in the same angular direction.

3. The vehicle door impact beam in claim 1 wherein both said inner terminus and said outer terminus of each of said first and second end portions comprise an arcuate surface extending through an angle less than 180 degrees.

4. The vehicle door impact beam in claim 3 wherein said inner termini of said first and second end portions are on opposite sides of said beam, 180 degrees from each other.

5. The vehicle door impact beam in claim 4 wherein said outer termini of said first and second end portions are on the same side of said beam.

6. The vehicle door impact beam in claim 1 wherein the segmental increments along each of said first and second taper surfaces, and on opposite sides of said axis, are at like angles relative to said axis.

7. The vehicle door impact beam in claim 1 wherein segmental increments along each of said first and second taper surfaces of each of said first and second end portions are radially oriented in alignment with said central axis.

8. A vehicle door impact beam comprising:
an elongated tubular member having a central axis, a peripheral wall, and a pair of ends, and comprising a central portion and first and second end portions;
said peripheral wall of each of said end portions being taper cut along the length thereof in a manner to expose a surface through the thickness of said wall on both sides of said central axis, and thereby provide first and second taper surfaces on opposite sides of said central axis;
said taper surfaces of each of said first and second end portions having an outer axial terminus at the respective outer end of said beam, and having an inner axial terminus spaced from said respective outer end of said beam; and
said taper surfaces in both said first and second end portions spiraling from said inner terminus to said outer terminus through an included angle of about 90 degrees.

9. The vehicle door impact beam and mount assembly comprising:
first and second mounts for attaching an impact beam to a vehicle door;
said mounts each having a planar portion and a recess to receive the ends of an impact beam;
an impact beam comprising an elongated tubular member having a central axis, a peripheral wall, and a pair of ends, and comprising a central portion and first and second end portions;
said peripheral wall of each of said end portions being taper cut along the length thereof in a manner to expose a surface through the thickness of said wall on both sides of said central axis, and thereby provide first and second taper surfaces on opposite sides of said central axis;
said taper surfaces of each of said first and second end portions having an outer axial terminus at the respective outer end of said beam, and having an inner axial terminus spaced from said respective outer end of said beam;
said taper surfaces in said first end portion both extending spirally from said inner terminus in said first end portion through an included angle of about 90 degrees to said outer terminus of said first end portion;
said taper surfaces in said second end portion both extending spirally from said inner terminus in said second end portion through an included angle of about 90 degrees to said outer terminus of said second end portion; and
said first and second end portions being secured to said first and second mounts in a rotational orientation relative to said central axis having said taper surfaces at said ends substantially equally spaced from said mounts.

10. The vehicle door impact beam and mount assembly in claim 9 wherein said taper surfaces of both said first and second end portions spiral in the same angular direction.

11. The vehicle door impact beam and mount assembly in claim 9 wherein both said inner terminus and said outer terminus of each of said first and second end portions comprises an arcuate surface extending through an angle less than 180 degrees; and
said inner termini of said first and second end portions are on opposite sides of said body, displaced 180 degrees from each other, said outer termini of said first and second end portions are on the same side of said beam, displaced zero degrees from each other.

12. The vehicle door impact beam and mount assembly in claim 9 wherein segmental increments along each of said first and second taper surfaces of each of said first and second end portions are radially oriented in alignment with said central axis.

13. The vehicle door impact beam in claim 1 wherein each said end portion has a central body and inner and outer body straddling transitions, said central body being characterized by the equation:

$$IA = X/TL\,(L) + Y$$

Where
IA = included angle at a particular location
m = slope of central body taper surface
X = slope of the taper surface times total taper length = m(TL)
TL = total taper length
L = the fraction of total taper length at a particular location
Y = the Y axis intercept of the body slope;
said outer transition being characterized by the equation:

$$IA = Z/TL\sqrt{TL/V}\,(\sqrt{L}) + W$$

Where
Z = parabola shape = (V)(c − W)
V = number of segments in the total taper length
W = parabola intercept with Y axis
c = included angle at TL/V
m = slope of central body taper surface;
and said inner transition is characterized by the equation;

$$IA = 360 - [Z/TL(\sqrt{TL/V})\sqrt{(TL - L)} + W].$$

14. The vehicle door impact beam in claim 13 wherein said body is characterized by the equation:

$$IA = (150/TL)(L) + 105;$$

for 0.2 TL ≧ L ≧ 0.8 TL.

15. The vehicle door impact beam in claim 14 wherein said outer end transition is characterized by the equation:

$$IA = 495/TL\sqrt{(TL/5)}\,\sqrt{L} + 36$$

for 0 ≦ L ≦ 0.2 TL.

16. The vehicle door beam in claim 15 wherein said second end transition is characterized by the equation:

$$IA = 360 - [495/TL \sqrt{(TL/5)} \sqrt{(TL - L)} + 36]$$

for $0.8\ TL \leq L \leq TL$.

17. A vehicle door impact beam comprising:
   an elongated tubular member having a central axis, a peripheral wall, and a pair of ends, and comprising a central portion and first and second end portions;
   said peripheral wall of at least said first end portion being taper cut along the length thereof through the thickness of said wall on both sides of said central axis in a manner to thereby provide first and second taper surfaces on opposite sides of said central axis;
   said taper surfaces of at least said first end portion having an outer axial terminus at the respective outer end of said beam, and having an inner axial terminus spaced from said respective outer end of said beam;
   the included angle of said wall between said first and second taper surfaces varying from greater than 180 degrees near said inner terminus to less than 180 degrees near said outer terminus; and
   said taper surfaces of at least said first end portion both extending spirally from said inner terminus in said first end portion through an angle to said outer terminus of said first end portion.

18. The vehicle door impact beam of claim 17 wherein said angle is about 90 degrees.

19. The vehicle door impact beam in claim 18 wherein both said inner terminus and said outer terminus extend through an angle less than 180 degrees.

20. The vehicle door impact beam in claim 17 wherein said first end portion has a central body and inner and outer body straddling transitions, said central body being characterized by the equation:

$$IA = X/TL(L) + Y$$

Where
   IA = included angle at a particular location
   m = slope of central body taper surface
   X = slope of the taper surface times total taper length = m(TL)
   TL = total taper length
   L = the fraction of total taper length at a particular location
   Y = the Y axis intercept of the body slope;
   said outer transition being characterized by the equation:

$$IA = Z/TL \sqrt{TL/V} (\sqrt{L}) + W$$

Where
   Z = parabola shape = (V)(c − W)
   V = number of segments in the total taper length
   W = parabola intercept with Y axis
   c = included angle at TL/V
   m = slope of central body taper surface;
   and said inner transition is characterized by the equation:

$$IA = 360 - [Z/TL(\sqrt{TL/V}) \sqrt{(TL - L)} + W].$$

21. The vehicle door impact beam in claim 20 wherein said body is characterized by the equation:

$$IA = (150/TL)(L) + 105;$$

for $0.2\ TL \geq L \geq 0.8\ TL$.

22. The vehicle door impact beam in claim 21 wherein said outer end transition is characterized by the equation:

$$IA = 495/TL \sqrt{(TL/5)}\ L + 36$$

for $0 \leq L \leq 0.2\ TL$.

23. The vehicle impact door beam in claim 22 wherein said second end transition is characterized by the equation:

$$IA = 360 - [495/TL \sqrt{(TL/5)} \sqrt{(TL - L)} + 36]$$

for $0.8\ TL \leq L \leq TL$.

* * * * *

UNITED STATES PATENT AND TRADEMARK OFFICE
CERTIFICATE OF CORRECTION

PATENT NO. : 5,123,694

DATED : June 23, 1992

INVENTOR(S) : Robert J. DePierre and Alessandro Libriani

It is certified that error appears in the above-identified patent and that said Letters Patent is hereby corrected as shown below:

Column 1, line 20;
    After "4,708,390" insert -- . --;

Column 1, line 33;
    "&o" should be -- to --;

Column 3, line 29;
    After "14 and" insert -- 16 --;

Signed and Sealed this

Second Day of November, 1993

Attest:

BRUCE LEHMAN

Attesting Officer     Commissioner of Patents and Trademarks